United States Patent
Collet et al.

(10) Patent No.: US 6,817,175 B2
(45) Date of Patent: Nov. 16, 2004

(54) HYDRAULIC SYSTEM ARCHITECTURE FOR CONTROLLING STEERING

(75) Inventors: Olivier Collet, Palaiseau (FR); Emmanuel Dorget, Puteaux (FR); Claire Patrigeon, Bièves (FR); Daniel Bucheton, Le Chesnay (FR)

(73) Assignee: Messiner-Bugatti, Velizy Villacoublay (FR)

( * ) Notice: Subject to any disclaimer, the term of this patent is extended or adjusted under 35 U.S.C. 154(b) by 10 days.

(21) Appl. No.: 10/360,639

(22) Filed: Feb. 10, 2003

(65) Prior Publication Data

US 2003/0188529 A1 Oct. 9, 2003

(30) Foreign Application Priority Data

Apr. 3, 2002 (FR) .............................. 02 02692

(51) Int. Cl.[7] .............................................. B64C 25/50
(52) U.S. Cl. ........................................ 60/405; 60/417
(58) Field of Search .......................... 60/403, 404, 405, 60/417

(56) References Cited

U.S. PATENT DOCUMENTS

| | | | | |
|---|---|---|---|---|
| 3,820,620 A | * | 6/1974 | Miller et al. ................... | 60/405 |
| 3,847,243 A | * | 11/1974 | Barth ........................... | 60/405 |
| 3,913,324 A | * | 10/1975 | Miller et al. .................. | 60/405 |
| 4,190,130 A | * | 2/1980 | Beck ............................. | 60/405 |
| 4,317,499 A | * | 3/1982 | Miller .......................... | 60/405 |
| 4,422,290 A | | 12/1983 | Huffman | |
| 4,476,677 A | * | 10/1984 | Hanshaw ..................... | 60/405 |
| 4,574,904 A | | 3/1986 | Goode | |

OTHER PUBLICATIONS

Patent Abstracts of Japan vol. 008, No. 227 (m–332), Oct. 18, 1984 & JP 59 109495 A (Mitsubishi Jukogyo KK), Jun. 25, 1984 *abrégé*.

* cited by examiner

*Primary Examiner*—Thomas E. Lazo
(74) *Attorney, Agent, or Firm*—Sughrue Mion, PLLC

(57) ABSTRACT

The invention relates to a hydraulic steering system architecture comprising at least one steering control actuator having chambers connected to the outlets of a directional-control valve, an accumulator, and an electrically-driven pump unit associated with an emergency supply. The hydraulic system also comprises a general selector arranged, in a normal mode of operation, to connect the feed port of the directional-control valve to a pressure-generator device and the return port of the directional-control valve to a main supply associated with the pressure-generator device, while also ensuring that the emergency supply is filled, and in an alternate mode of operation, to connect the feed port of the directional-control valve to the accumulator.

8 Claims, 1 Drawing Sheet

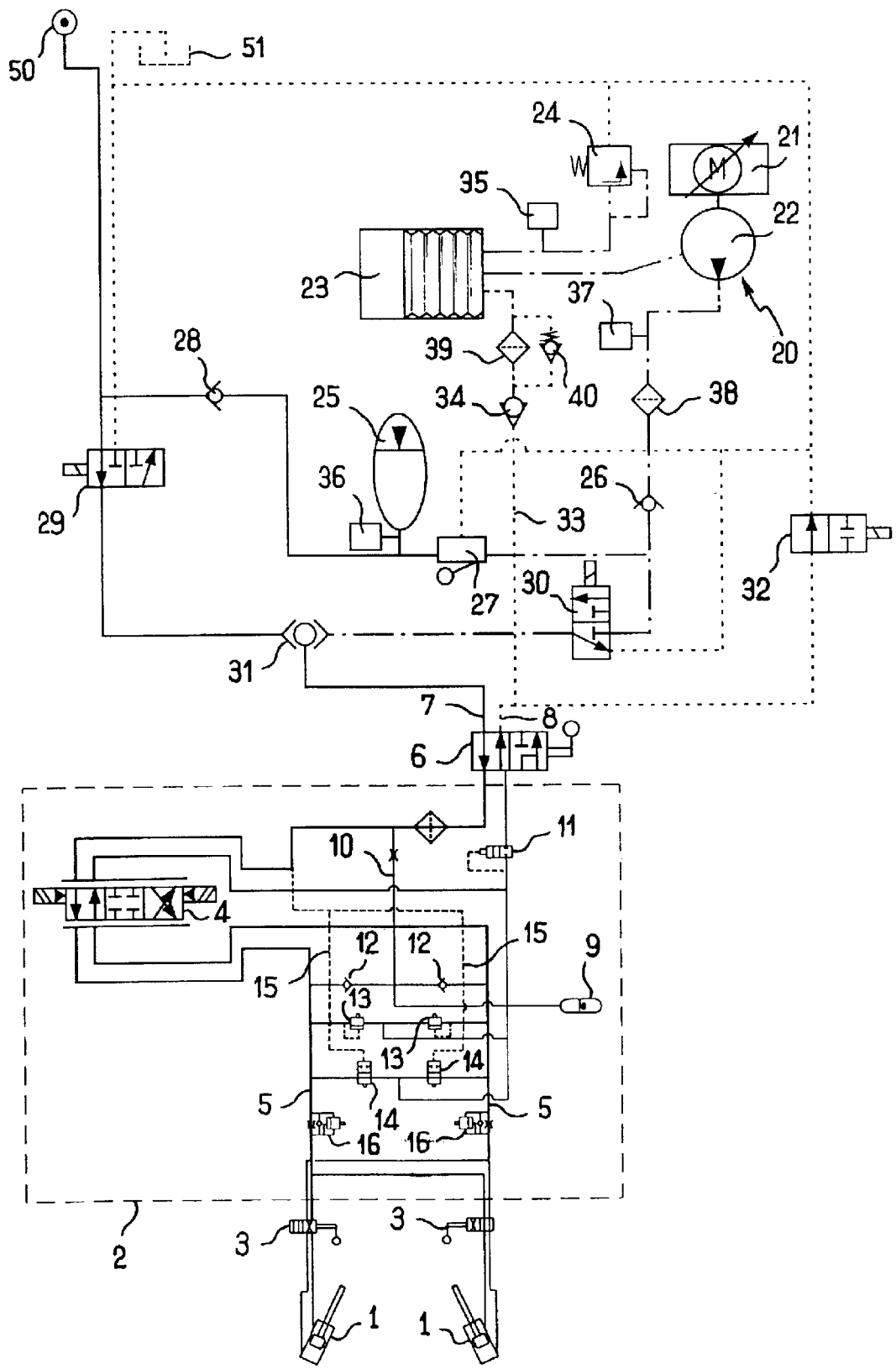

HYDRAULIC SYSTEM ARCHITECTURE FOR CONTROLLING STEERING

FIELD OF THE INVENTION

The invention relates to an architecture for a hydraulic steering system, intended in particular for fitting to an aircraft.

BACKGROUND OF THE INVENTION

Aircraft generally include nosewheel landing gear having one or more wheels that are steerable in order to enable the aircraft to be taxied. For aircraft of large size, one or more steerable bogies are sometimes provided on the main landing gear, in addition to the steering device for the nose landing gear.

The steerable portions of landing gear are generally actuated by one or more actuators fed by the pressure-generator device of the aircraft via a hydraulic steering block situated close to the actuators, as a general rule directly on the landing gear. In conventional manner, the hydraulic steering block comprises a directional-control valve, generally of the proportional type, serving to control the delivery of fluid to the actuator(s) so as to control the steering of the steerable portion of the landing gear in response to orders from the pilot.

Steering is generally not considered as being a function that is critical from the point of view of aircraft safety. Loss of steering does not lead to catastrophic consequences, and the steering function can be compensated by differential braking, optionally associated with differential thrust from the engines. If necessary, the aircraft can be towed.

It is therefore common practice for the hydraulic steering block to be connected to a single feed source only, the hydraulic block being arranged to allow the steerable portion of the landing gear to turn freely when the aircraft is stationary or in the event of the pressure-generator device not operating.

Nevertheless, the loss of the steering function can interfere severely with aircraft operation. Controlling an aircraft that is taxiing by differential braking does not enable it to make sharp turns, and for aircraft of large size that can be incompatible with the width available on taxiways. Furthermore, making sharp turns by blocking the wheels of the main landing gear on one side of the aircraft stresses said landing gear strongly in twisting which reduces its lifetime. In addition, requiring the use of a tractor to tow the aircraft can lead to a significant loss of time, and that can disturb the running of an airport in unacceptable manner.

In a conventional technique, the reliability of the steering function can be increased by duplicating the main feed circuit by means of an emergency feed circuit.

However, that solution when applied to the present situation presents numerous drawbacks. On large airliners, the hydraulic steering block of the nose landing gear is remote from the pressure-generator device of the aircraft (which is associated with the engines of the aircraft) by a distance of several tens of meters, and duplicating the pipework would give rise to harmful extra weight. Furthermore, segregation requirements make it essential for the main and emergency circuits to follow different paths through the structure of the aircraft, thereby complicating aircraft design.

The state of the art is also shown by documents: U.S. Pat. No. 4,422,920; U.S. Pat. No. 4,574,904; U.S. Pat. No. 4,190,130; and JP-A-59 109 495, and the teaching thereof is commented on below.

Document U.S. Pat. No. 4,422,290 describes an architecture for a steering system that comprises a steering control actuator connected to a proportional directional-control valve. In normal mode, a general selector connects the feed port of the directional-control valve to a pressure-generator device, and it connects the return port to a supply (which is not filled in normal mode), while in breakdown mode, said directional-control valve feed port is put into communication both with the pressure-generator device and with an accumulator. A genuine alternate mode of operation is not available.

Document U.S. Pat. No. 4,574,904 describes another architecture in which an accumulator is maintained under pressure in a normal mode of operation by an auxiliary pump. In breakdown mode, a valve puts the accumulator into communication with the central directional-control valve, said accumulator then no longer being connected to the auxiliary pump.

Document U.S. Pat. No. 4,190,130 describes another architecture having an auxiliary pump and an accumulator, in which the auxiliary pump draws the necessary fluid from the main supply.

Finally, document JP-A-59 109 495 describes a steering system architecture in which the emergency system possesses its own proportional directional-control valve, with the valve of the main circuit being shunted in breakdown mode.

OBJECT OF THE INVENTION

The invention seeks to provide good reliability for the steering function of an aircraft without suffering the drawbacks or the limitations of the solutions mentioned above.

BRIEF SUMMARY OF THE INVENTION

The hydraulic steering system architecture of the invention comprises at least one steering control actuator having chambers connected to the outlets of a directional-control valve which presents a feed port and a return port, and the architecture also comprises an accumulator and an electrically-driven pump unit associated with an emergency supply which is arranged to maintain a predetermined pressure level in the accumulator, the hydraulic system further comprising a general selector arranged, in a normal mode of operation, to connect the feed port of the directional-control valve to a pressure-generator device and the return port of the directional-control valve to a main supply associated with the pressure-generator device, while also ensuring that the emergency supply is filled, and in an alternate mode of operation, to connect the feed port of the directional-control valve to the accumulator.

Thus, while the pressure-generator device of the aircraft is functioning normally, the hydraulic steering block is fed as in the prior art by the pressure-generator device of the aircraft.

In the event of the pressure-generator device breaking down, which corresponds to an alternate mode of operation, the general selector switches over feed to the directional-control valve in such a manner that the valve is fed from the accumulator, with the electrically-driven pump unit then serving to reinflate the accumulator as fluid is consumed by the hydraulic steering block.

Thus, the steering function continues to be provided in the event of the pressure-generator device breaking down, and it is no longer necessary to have recourse to a heavy and expensive emergency feed circuit.

In a particular embodiment, the general selector comprises a normal mode valve and an alternate mode valve connected to the two inlets of a shuttle valve having an outlet connected to the feed port of the directional-control valve so that in normal operation mode, the normal mode valve connects the corresponding inlet of the shuttle valve to the pressure-generator device while the alternate mode valve connects the other inlet of the shuttle valve to the main supply, and in the alternate mode of operation, the normal mode valve connects the corresponding inlet of the shuttle valve to the main supply while the alternate mode valve connects the other inlet of the shuttle valve to the accumulator.

Advantageously, the general selector is arranged in the normal mode of operation to connect the return port of the directional-control valve to the main supply or to the emergency supply as a function of information from associated sensors, and in the alternate mode of operation to connect the return port of the directional-control valve to the emergency supply.

In which case, it is preferable for the return port of the directional-control valve to be connected both to the main supply and to the emergency supply, the general selector including a return valve which, in the normal mode of operation, leaves the connection to the main supply or to the emergency supply open, and in the alternate mode of operation, closes the connection to the main supply.

In an aspect of the invention, the accumulator is fitted with a pressure sensor for delivering information concerning the state of inflation of said accumulator, said information being used in the alternate mode of operation to control the electrically-driven pump unit to reinflate the accumulator.

Also advantageously, the accumulator is connected via a check valve to the pressure-generator device so that it can be filled and pre-loaded. The accumulator is also protected from excess pressure by a pressure-relief valve which is connected to the main supply, the pressure-relief valve being manually operable to enable the accumulator to be emptied for the purposes of maintaining the system.

Other characteristics and advantages of the invention appear more clearly in the light of the following description of a particular, non-limiting embodiment of the invention.

BRIEF DESCRIPTION OF THE DRAWING

Reference is made to the sole FIGURE of the accompanying drawing which is a diagram of an architecture in accordance with the invention for a hydraulic steering system associated with an aircraft landing gear, the system being shown in a position that corresponds to its normal mode of operation.

DETAILED DESCRIPTION OF THE INVENTION

With reference to the FIGURE, and in conventional manner, the steerable portion of the landing gear (not shown) is actuated by two actuators 1 disposed in a push-pull configuration. In this configuration, one of the portions of each actuator (in this case its cylinder) is pivotally mounted on the landing gear about an axis parallel to the turning axis of the steerable portion of the landing gear, while the other portion of each actuator (the rod) is pivotally mounted on the steerable portion of the landing gear about an axis parallel to the two above-specified axes.

The two actuators 1 are fed by a hydraulic steering block 2 symbolized by a dashed-line rectangle via rotary directional-control valves 3 which enable the hydraulic feed and return to the chambers of the associated actuators 1 to be switched over appropriately when each actuator passes through a position in which all three axes corresponding thereto are contained in the same plane.

Depending on the angular position of the steerable portion of the landing gear, the two actuators 1 may both push together, pull together, or operate differentially in "push-pull". However, whatever the angular position, each of the chambers of one actuator is connected to one of the chambers of the other actuator so that the two actuators 1 can be considered from the hydraulic point of view as comprising a single double-acting actuator.

Still in conventional manner, the hydraulic steering block 2 further comprises a proportional directional-control valve 4 (or servo-valve) serving to deliver hydraulic fluid via two distribution lines 5 to the appropriate chambers of the actuators 1 in order to cause the steerable portion of the landing gear to turn in the direction desired by the pilot. In conventional manner, one or more sensors (not shown) deliver signals representative of the angular position of the steerable portion of the landing gear, which signals are integrated in a feedback loop controlling the position of the proportional directional-control valve 4.

The hydraulic steering block 2 is connected to an external hydraulic circuit (described below) via a mechanically-controlled isolating valve 6 which is generally situated close to the hinge between the landing gear and the aircraft, and which serves to isolate the hydraulic steering block 2 when the landing gear is raised so as to prevent any untimely movement of the steerable portion of the landing gear while the landing gear is retracted in its bay in the aircraft. The isolating valve 6 connects the feed port of the servo-valve 4 to a feed line 7 and the return port of the servo-valve 4 to a return line 8.

In this case, the hydraulic block 2 includes an accumulator 9 which is inflated by a branch connection 10 of the feed line 7, and which is maintained at a rated pressure by a rating valve 11 on the return line 8. By way of information, this rated pressure is generally relatively low, for example of the order of about fifteen bars.

The accumulator 9 is also connected to each of the distribution lines 5 via check valves 12 which enable a certain quantity of fluid to be transferred from the accumulator 9 to the chambers of the corresponding actuators 1 in the event of the pressure in said chambers dropping below the rated pressure of the accumulator 9. This disposition avoids cavitation in the chambers of the actuators 1.

Furthermore, the accumulator 9 is connected to each of the distribution lines 5 via pressure-relief valves 13 which enable a certain quantity of fluid to be discharged into the accumulator in the event of the pressure in the corresponding chambers of the actuators 1 exceeding the rated pressure of the pressure-relief valves 13. This disposition thus serves to protect the actuators against excess pressure.

Finally, the accumulator 9 is connected to the distribution lines 5 via valves 14 which are controlled by a branch connection 15 from the feed line 7 so that when the hydraulic steering block 2 is being fed, the valves 14 are closed and the distribution lines 5 are isolated from each other, but when the hydraulic steering block 2 is not being fed, then the valves 14 are open so as to allow the chambers of the actuators to communicate with one another and with the accumulator 9.

As a result, while the aircraft is being towed, the steerable portion of the landing gear can turn freely, with the fluid contained in each of the chambers of the actuators 1 being transferred into the other chambers or into the accumulator 9 as required, without any resistance being opposed to turning of the steerable portion of the landing gear.

Finally, the hydraulic steering block 2 includes damping valves 16 (also known as "anti-shimmy" valves) in each of the feed lines 5 for the purpose of damping any angular oscillations that might occur in the steerable portion of the landing gear, so as to avoid any coupling between said oscillations and the landing gear vibrating in any of its resonant modes.

According to an essential aspect of the invention, emergency means are provided enabling the hydraulic steering block 2 to be fed in the event of the pressure-generator device 50 of the aircraft failing.

These means comprise an electrically-driven pump unit 20 comprising in this case a variable speed electric motor 21 driving a pump 22 of fixed cylinder capacity. The pump unit 20 is associated via its intake port with an emergency supply 23 which is maintained under pressure by a rating valve 24. It should be observed that leaks from the pump 22 are directed to the emergency supply 23.

The outlet port from the pump unit 20 is connected to an accumulator 25 via a check valve 26. The accumulator 25 is pre-loaded to the pressure of the normal circuit by a check valve 28, and it is protected from excess pressure by a pressure-relief valve 27. It should be observed that the accumulator 25 is also connected to the pressure-generator device of the aircraft, referenced 50, via the check valve 28, thus enabling it to be inflated by the pressure-generator device 50 of the aircraft when it is in operation.

Advantageously, the rating valve 27 is manually operable to enable the accumulator 25 to be emptied during maintenance.

Furthermore, the emergency means also comprise a general selector made up in this case of a normal mode valve 29 and an alternate mode valve 30 whose outlets are connected to the inlets of a shuttle valve 31, the outlet from the shuttle valve 31 forming the feed line 7 to the hydraulic steering block 2. Furthermore, the general selector also comprise a return valve 32 placed on the return line 8 of the hydraulic steering block 2. This valve 32 enables the return flow from the line 8 to be directed either directly to the supply 51 in normal mode, or else to the emergency supply 23 in normal mode to fill it, or else in emergency mode to close the circuit.

The emergency means operate as follows.

In the normal operation mode, the normal mode valve 29 puts the pressure-generator device 50 of the aircraft into communication with the corresponding inlet of the shuttle valve 31, while the alternate mode valve 30 puts the other inlet of the shuttle valve 31 into communication with the main supply 51 of the aircraft, as shown in the figure.

The feed line 7 of the hydraulic steering block 2 is thus connected to the pressure-generator device 50 of the aircraft.

The return line 8 of the hydraulic steering block 2 is then in communication with the main supply 51 of the aircraft via the return valve 32, as shown.

It should be observed that there exists a line 33 which also puts the return line 8 into communication with the emergency supply 23 via a check valve 34, which enables the emergency supply 23 to be filled each time its pressure drops below the pressure that exists in the return circuit leading to the main supply 51 of the aircraft. A pressure sensor 35 serves to verify whether the emergency supply 23 is properly filled.

In addition, the accumulator 25 is kept inflated by the pressure-generator device 50 of the aircraft.

In normal mode, the line 33 enables the emergency supply 23 to be filled by closing the valve 32, fluid then flowing through said emergency supply 23, with the pressure-relief valve 24 ensuring that the tank is pressurized and filled.

When the required level is reached, the valve 32 opens, allowing the return flow to pass directly to the main supply 51, thus avoiding polluting the filter 39 with a continuous flow. The reserve volume of oil is held captive in the emergency supply 23 by the check valve 34 and the pressure-relief valve 24.

A level sensor (not shown in the FIGURE) integrated in the emergency supply 23 and the pressure sensor 35 serves to control filling cycles for the emergency supply.

In addition, the pressure sensor 35 enables the valve 32 to be opened in the event of the pressure in the emergency supply 23 becoming too great.

In alternate mode, the valves 29, 30, and 32 are operated (to take up the positions that are not shown) so that the inlet of the shuttle valve 31 associated with the normal mode valve 29 is connected to the return leading to the main supply 51 of the aircraft, while the inlet of the shuttle valve 31 associated with the alternate mode valve 30 is put into communication with the accumulator 25.

The feed line 7 is thus in communication with the accumulator 25 and the hydraulic steering block 2 is fed by the accumulator.

The return valve 32 is also closed, so that the return line 8 of the hydraulic steering block 2 is connected solely to the emergency supply 23.

A closed circuit is thus formed in which fluid passes in succession via the emergency supply 23 and then the electrically-driven pump unit 20 in order to inflate the accumulator 25.

The accumulator 25 then discharges into the hydraulic steering block 2 via the alternate mode valve 30 and the shuttle valve 31, as needed. Finally, the fluid returns from the hydraulic steering block 2 to the emergency supply 23, thus looping the closed circuit.

The pressure-relief valve 24 protects the emergency supply 23 from excess pressures generated by a temperature rise or by differences in the volumes displaced by the actuators.

The emergency means thus operate in self-contained manner, without calling on any auxiliary hydraulic feed. The emergency means should be installed as close as possible to landing gear in question, for example in its bay or directly on the landing gear.

It should be observed that a pressure sensor 36 serves at all times to measure the pressure that exists in the accumulator 25 and thus to allow the pump unit 20 to be operated as needed to reinflate the accumulator 25.

In order to monitor the operation of the electrically-driven pump unit 20, a pressure sensor 37 is advantageously placed at the outlet from the pump 22.

Furthermore, in order to protect the hydraulic components and to clean the hydraulic fluid, a filter 38 is disposed at the outlet from the pump unit 20 and a filter 39 associated with a bypass 40 is disposed on the line 33 for filling the emergency supply 23.

The invention is not limited to the particular embodiment described above, but on the contrary extends to cover any variant coming within the scope of the invention as defined by the claims.

In particular, although the emergency means are described as being separate from the hydraulic steering block, the emergency means could be integrated in the hydraulic steering block.

Although the general selector is shown as comprising the normal mode valve, the alternate mode valve, the check valve, and the return valve, any other hydraulic component or group of hydraulic components enabling feed to the hydraulic steering block to be switched from the main pressure-generator device 50 of the aircraft to the accumulator 25 is covered in the ambit of the invention.

Although it is stated that the directional-control valve is of the proportional type (i.e. a servo-valve) it is also possible to use any type of directional-control valve that enables the flow of fluid in the chambers of the steering actuators to be controlled, in particular "bang-bang" type directional-control valve devices, or the equivalent.

Finally, although the hydraulic steering system architecture of the invention is shown as being applied to a device for actuating the steerable portion of landing gear in which the device is made up of steering actuators mounted in a push-pull configuration, the invention also applies to an actuator device of the type having a rack actuated by two terminal pistons each sliding in a chamber, or to an actuator device of the type having a single actuator, or indeed of the type having a rotary hydraulic motor, or any equivalent type of actuation.

What is claimed is:

1. A hydraulic steering system architecture comprising at least one steering control actuator having chambers connected to the outlets of a directional-control valve which presents a feed port and a return port, wherein the hydraulic system comprises an accumulator and an electrically-driven pump unit associated with an emergency supply which is arranged to maintain a predetermined pressure level in the accumulator, and wherein the hydraulic system comprises a general selector arranged, in a normal mode of operation, to connect the feed port of the directional-control valve to a pressure-generator device and the return port of the directional-control valve to a main supply associated with the pressure-generator device, while also ensuring that the emergency supply is filled, and in an alternate mode of operation, to connect the feed port of the directional-control valve to the accumulator.

2. An architecture according to claim 1, wherein the general selector is arranged, in the normal mode of operation, to connect the return port to the directional-control valve to the main supply or to the emergency supply as a function of information from associated sensors, and in the alternate mode of operation, to connect the return port of the directional-control valve to the emergency supply while closing the connection to the main supply.

3. An architecture according to claim 2, wherein the return port of the directional-control valve is connected both to the main supply and to the emergency supply, the general selector including a return valve which, in the normal mode of operation, leaves the return port of the directional-control valve connected to the main supply or to the emergency supply, and in the alternate mode of operation, closes the connection to the main supply.

4. An architecture according to claim 1, wherein the accumulator is fitted with a pressure sensor for delivering information concerning the state of inflation of said accumulator, said information being used in the alternate mode of operation to control the electrically-driven pump unit to reinflate the accumulator.

5. An architecture according to claim 1, wherein the accumulator is connected via a check valve to the pressure-generator device so that it can be filled and pre-loaded.

6. An architecture according to claim 1, wherein the accumulator is protected from excess pressure by a pressure-relief valve which is connected to the main supply.

7. An architecture according to claim 6, wherein the pressure-relief valve is manually operable to enable the accumulator to be emptied for the purpose of maintaining the system.

8. A hydraulic steering system architecture comprising at least one steering control actuator having chambers connected to the outlets of a directional-control valve which presents a feed port and a return port, wherein the hydraulic system comprises an accumulator and an electrically-driven pump unit associated with an emergency supply which is arranged to maintain a predetermined pressure level in the accumulator, and wherein the hydraulic system comprises a general selector arranged, in a normal mode of operation, to connect the feed port of the directional-control valve to a pressure-generator device and the return port of the directional-control valve to a main supply associated with the pressure-generator device, while also ensuring that the emergency supply is filled, and in an alternate mode of operation, to connect the feed port of the directional-control valve to the accumulator, wherein the general selector comprises a normal mode valve and an alternate mode valve connected to the two inlets of a shuttle valve having an outlet connected to the feed port of the directional-control valve so that in normal operation mode, the normal mode valve connects the corresponding inlet of the shuttle valve to the pressure-generator device while the alternate mode valve connects the other inlet of the shuffle valve to the main supply, and in the alternate mode of operation, the normal mode valve connects the corresponding inlet of the shuttle valve to the main supply while the alternate mode valve connects the other inlet of the shuttle valve to the accumulator.

* * * * *